United States Patent [19]

Johnson et al.

[11] Patent Number: 4,667,258
[45] Date of Patent: May 19, 1987

[54] DISK DRIVE WITH MULTIPLE HEAD CARTRIDGE

[75] Inventors: Ronald R. Johnson, Shorewood; James A. Melville, St. Louis Park, both of Minn.

[73] Assignee: IXI Laboratories, Inc., Eden Prairie, Minn.

[21] Appl. No.: 593,907

[22] Filed: Mar. 27, 1984

[51] Int. Cl.⁴ .............................................. G11B 5/016
[52] U.S. Cl. ..................................... 360/99; 360/104; 360/106; 360/109; 369/270
[58] Field of Search ................... 360/97, 99, 104, 105, 360/106, 109; 369/270

[56] References Cited

U.S. PATENT DOCUMENTS

| | | |
|---|---|---|
| D. 245,125 | 7/1977 | Chou et al. . |
| D. 246,177 | 10/1977 | Dalziel . |
| D. 249,343 | 9/1978 | Ronzani . |
| D. 249,346 | 9/1978 | Chou et al. . |
| D. 264,340 | 5/1982 | Iftikar et al. . |
| 3,153,241 | 10/1964 | Ramrath et al. . |
| 3,436,082 | 4/1969 | Bostrom et al. ............... 369/270 X |
| 3,593,327 | 7/1971 | Shill ............................ 360/97 |
| 3,651,501 | 3/1972 | Cote ........................... 360/105 X |
| 3,863,395 | 2/1975 | Brown . |
| 3,864,752 | 2/1975 | Thompson . |
| 3,890,643 | 6/1975 | Dalziel . |
| 3,898,814 | 8/1975 | Chou et al. . |
| 3,939,768 | 2/1976 | Medley . |
| 3,941,052 | 3/1976 | Dalziel . |
| 3,960,074 | 6/1976 | Chou . |
| 3,964,103 | 6/1976 | Thompson et al. . |
| 4,012,785 | 3/1977 | MacDougall, Jr. . |
| 4,030,137 | 6/1977 | Dalziel . |
| 4,040,106 | 8/1977 | Medley . |
| 4,077,236 | 3/1978 | Dalziel . |
| 4,097,908 | 6/1978 | Chou et al. ................. 360/109 X |
| 4,161,004 | 7/1979 | Dalziel . |
| 4,323,939 | 4/1982 | Iftikar et al. . |
| 4,347,535 | 8/1982 | Dalziel . |
| 4,367,502 | 1/1983 | Iftikar et al. . |
| 4,541,086 | 9/1985 | Tanaka ...................... 369/270 X |

FOREIGN PATENT DOCUMENTS

| | | | |
|---|---|---|---|
| 2150524 | 4/1973 | Fed. Rep. of Germany | ........ 360/99 |
| 1401594 | 7/1975 | United Kingdom | ............. 360/105 |

OTHER PUBLICATIONS

*Automatically Assisted Cartridge*, N. Leon, IBM Technical Disclosure Bulletin, vol. 22, No. 7, 12/1979, pp. 2905-2906.

Primary Examiner—Carlton R. Croyle
Assistant Examiner—Theodore Olds
Attorney, Agent, or Firm—Merchant, Gould, Smith, Edell, Welter and Schmidt

[57] ABSTRACT

A universal disk drive system (30) incorporates multiple read/write heads (204) supported on a rotatable carousel assembly (180) for selective positioning and alignment relative to a flexible magnetic disk on a drive spindle (120). A disk is received and fed along an input path to the drive spindle (120) by feed rollers (36,38) driven in unison. A clamp cone assembly (90) is mounted for movement relative to the drive spindle (120) for clamping either one of two predetermined sizes of disks against the drive spindle with coaxial inner and outer clamp cones (102, 104). The carousel assembly (180) includes a spider (186) supported for rotation about an angled spindle support (158). A read/write head (204) is supported on each angled arm of the spider (186) for precise radial and pivotal alignment relative to the disk by means of a slidable carriage (220) and azimuth adjustment module (246). Rotation of the carousel assembly (180) is controlled by an index and locking assembly (320).

40 Claims, 13 Drawing Figures

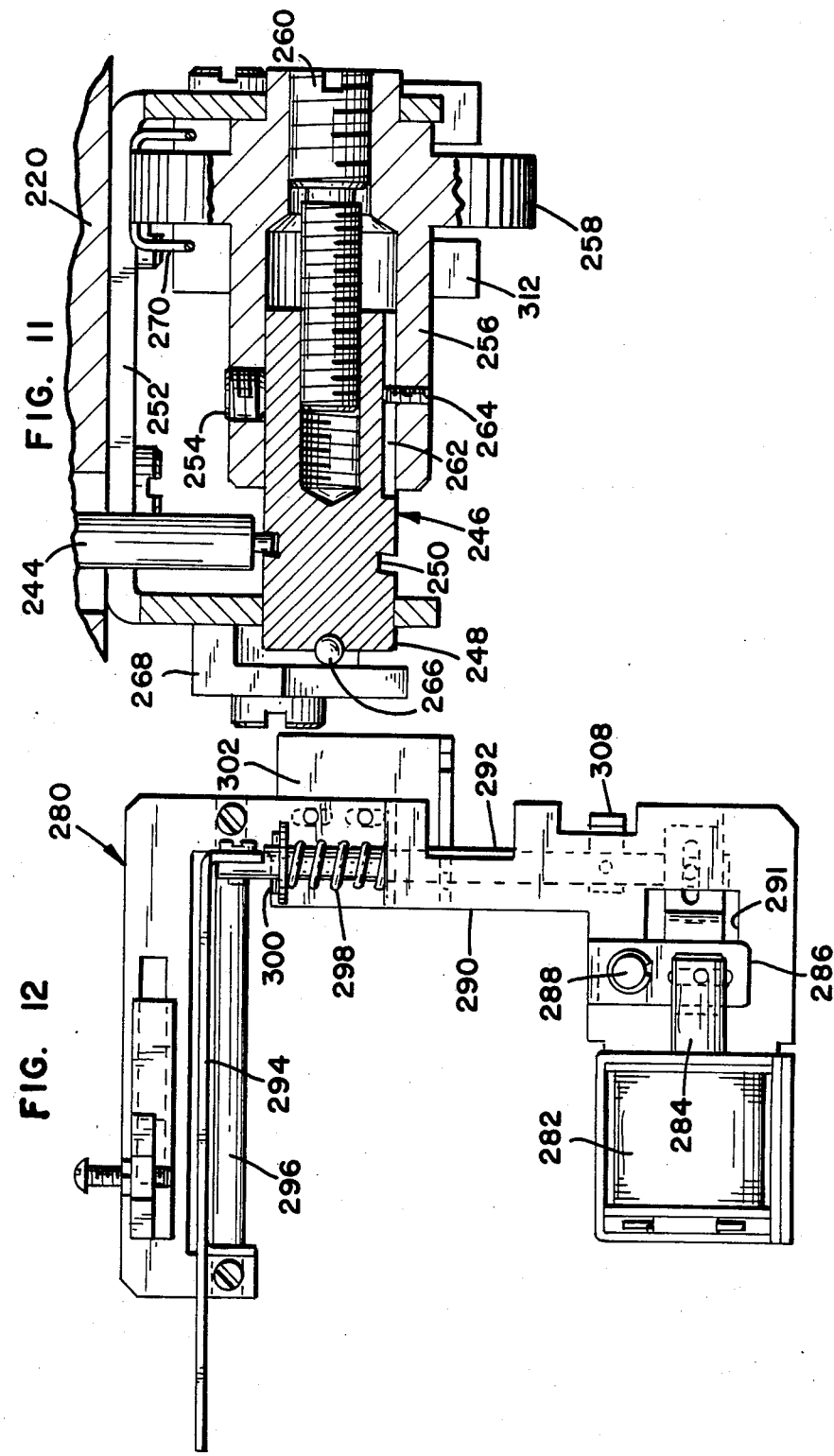

DISK DRIVE WITH MULTIPLE HEAD CARTRIDGE

TECHNICAL FIELD

The present invention relates to a disk drive with a multiple head cartridge. More particularly, this invention concerns a universal disk drive system which incorporates multiple read/write heads mounted for positive selective positioning and alignment to facilitate data processing operations and interchange with flexible magnetic disks of various sizes and density formats.

BACKGROUND ART

Floppy or flexible magnetic disks are utilized widely as mass memories for personal computers, word processors and the like. Currently, the floppy disks of 8 or 5¼ inch outside diameters are most popular, however, disks of other sizes may also come into use. In addition to different outside diameters, such floppy disks have different center hole sizes and different recording track density formats. For example, 48 or 96 tracks per inch (TPI) are industry standards for the 5¼ inch floppy disks. Such floppy disks are commercially available from various manufacturers, and there can also be slight manufacturing variances between the disks from different manufacturers. It will therefore be appreciated that there are several variables associated with floppy disks and that the number of variables will increase with the expected development of other disks for further applications of such magnetic storage devices.

The transfer of data to and from such floppy disks is accomplished by means of drives incorporating electronic read/write heads. Such drives are commerically available from various manufacturers, and each in turn is somewhat different and usually requires slightly different alignment and positioning with respect to the disks for proper operation. In addition to the variables associated with floppy disks, there are thus several other variables associated with the read/write heads. Disks recorded on one brand or model of drive may not be compatible with another drive. This in turn leads to interchange difficulties between equipment. These variables will also increase with the growing utilization of such devices in various data processing applications.

The difficulty in obtaining compatability between different disks and drives has become an increasing problem in the industry. Heretofore, the popular approach has been to adapt a particular drive for use with a particular disk size and format. This of course leads to a proliferation of drive types, which is duplicative and unnecessarily complicated and expensive. The changeover time involved in converting a given set-up for use with another disk and format has been costly. Other problems with this prior approach include higher maintenance requirements and poor accommodation of emerging recording technologies. Heretofore, there has not been available a universal disk drive that will conveniently accept for read/write operations disks of different sizes and recording density formats.

A need has thus developed for a disk recording system incorporating a carousel with multiple read/write heads which can be selectively moved into position and aligned as necessary, and which incorporates a feed assembly adapted for use with disks of various sizes.

SUMMARY OF INVENTION

The present invention comprises an improved disk drive which overcomes the foregoing and other difficulties associated with the prior art. In accordance with the invention, there is provided a universal disk drive system which is adapted for use with floppy disks of different sizes and track density formats, and which incorporates multiple read/write heads that can be selectively positioned and aligned as necessary in accordance with the type of disk being handled. The system herein includes a spider which is mounted for rotational indexing about an inclined fixed spindle support. A read/write head is mounted on each arm of the spider. The read/write heads can be all identical or different depending upon the configuration desired for the particular application. Each read/write head is supported on a movable carriage assembly for precise positioning with respect to a disk, both in a radial position relative to particular recording tracks on the disk, as well as in a rotational or azimuth position at the various radial positions of the head. Each read/write head is mounted on an adapter plate which is pivotally adjustable relative to a carriage movable radially relative to the disk when the spider supporting that head is located in an operative position. Sensors are provided on each spider arm for sensing positioning of the head. A rotatable male/female drive spindle is mounted on a shaft extending through the fixed spindle. Complementary coaxial cones are mounted for movement relative to the drive spindle to clamp a disk of either one of two predetermined center-hole sizes therebetween for driving engagement. The clamping cones are mounted on a pair of pivotal clamp arms carrying pinch rollers for advancing the disks into or out of the system. Sensors are provided for sensing indexing of a disk, its type, etc.

BRIEF DESCRIPTION OF THE DRAWINGS

A better understanding of the invention can be had by reference to the following Detailed Description in conjunction with the accompanying Drawings, wherein:

FIG. 11 is an enlarged partial cross-sectional view taken generally along lines 11—11 of FIG. 7 in the direction of the arrows;

FIG. 12 is an enlarged cross-sectional view taken generally along lines 12—12 of FIG. 9 in the direction of the arrows.

DETAILED DESCRIPTION

Figure 1:
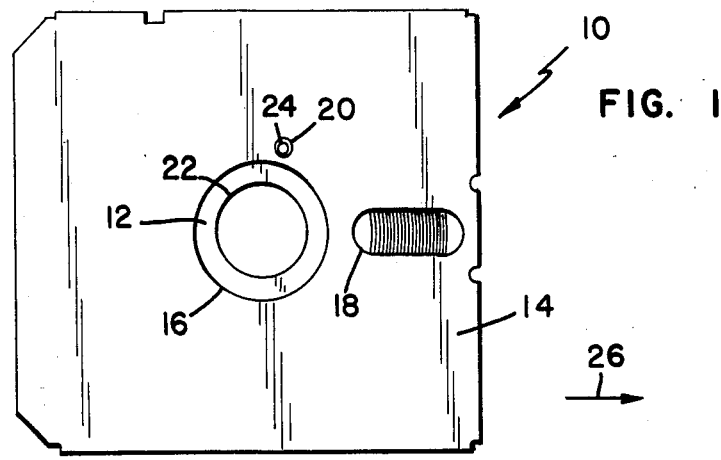
FIG. 1 is an illustration of a typical flexible magnetic disk or diskette.

Referring now to the Drawings, wherein like reference numerals designate like or corresponding elements throughout the views, and particularly referring to FIG. 1, there is shown a diskette 10 of the type used in personal computers, word processing systems and the like. The disk or diskette 10 comprises a conventional flexible or floppy magnetic recording disk 12 supported within a semi-rigid enclosure or jacket 14, which includes three access openings 16, 18 and 20 on opposite sides thereof. The circular access opening 16 is for the central opening 22 on the floppy disk 12. The offset elongated opening 18 overlies a radial portion of the tracks on the floppy disk 12 for access by the read/write head (not shown) of a disk drive. The offset circular opening 20 is for access registry with an index hole 24 in the floppy disk 12, which hole is uncovered with each revolution of the disk. As illustrated, the diskette 10 comprises a 5¼ inch disk having a recording track density of either 48 or 96 tracks per inch (TPI). The diskette 10 is normally inserted into a drive (not shown) in the direction indicated by arrow 26. The variables associated with the diskette 10 are therefore the external size of jacket 14, the internal size of the center hole 22 of the disk 12, and the track density. As will be explained more fully hereinafter, the present invention comprises a universal disk drive system which incorporates a multiple head cartridge or carousel for compatability with various disks.

Figure 5:
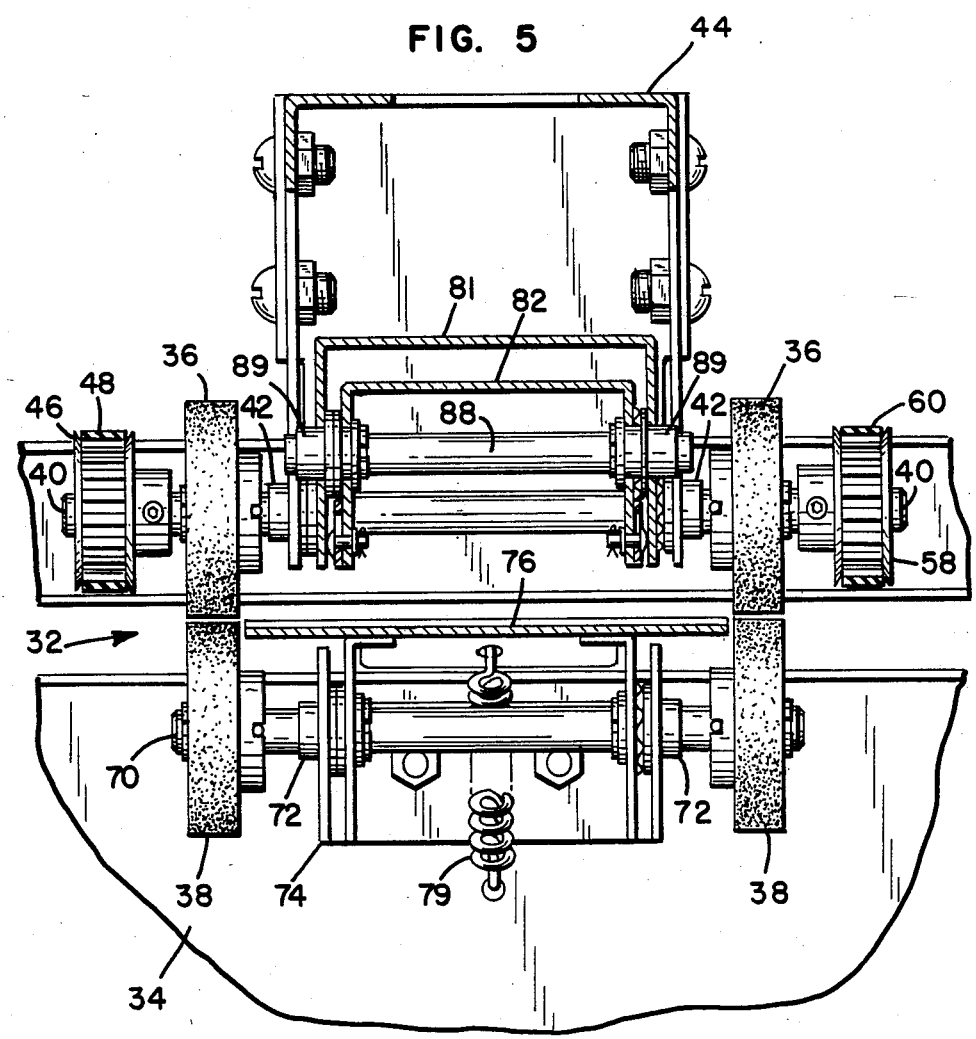
FIGS. 5 and 6 are enlarged vertical sectional views taken generally along lines 5—5 and 6—6, respectively, of FIG. 4 in the directions of the arrows showing certain details of the disk feed section of the system.
Figure 2:
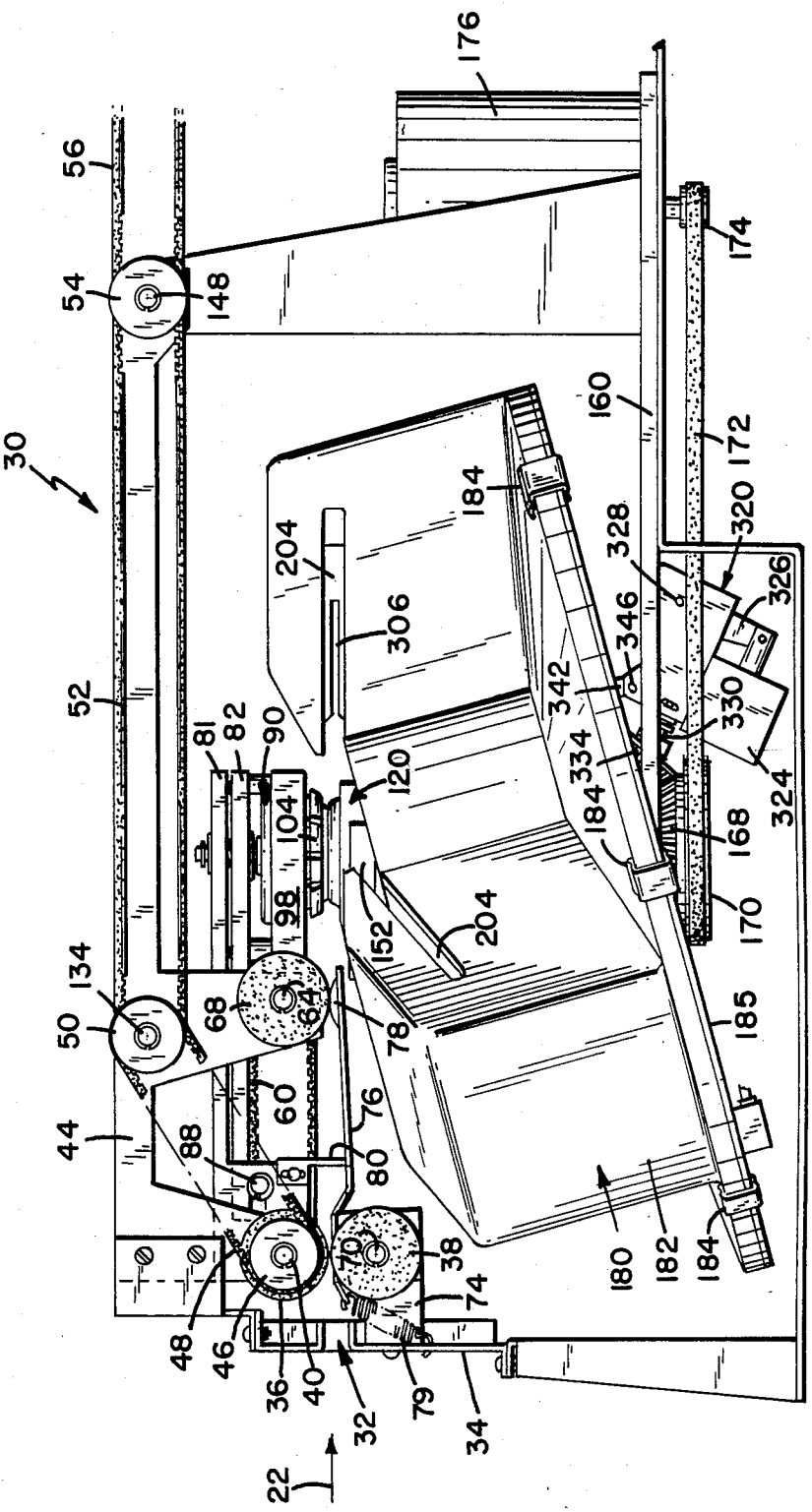
FIG. 2 is a side view of the universal disk drive system of the invention.
Figure 3:
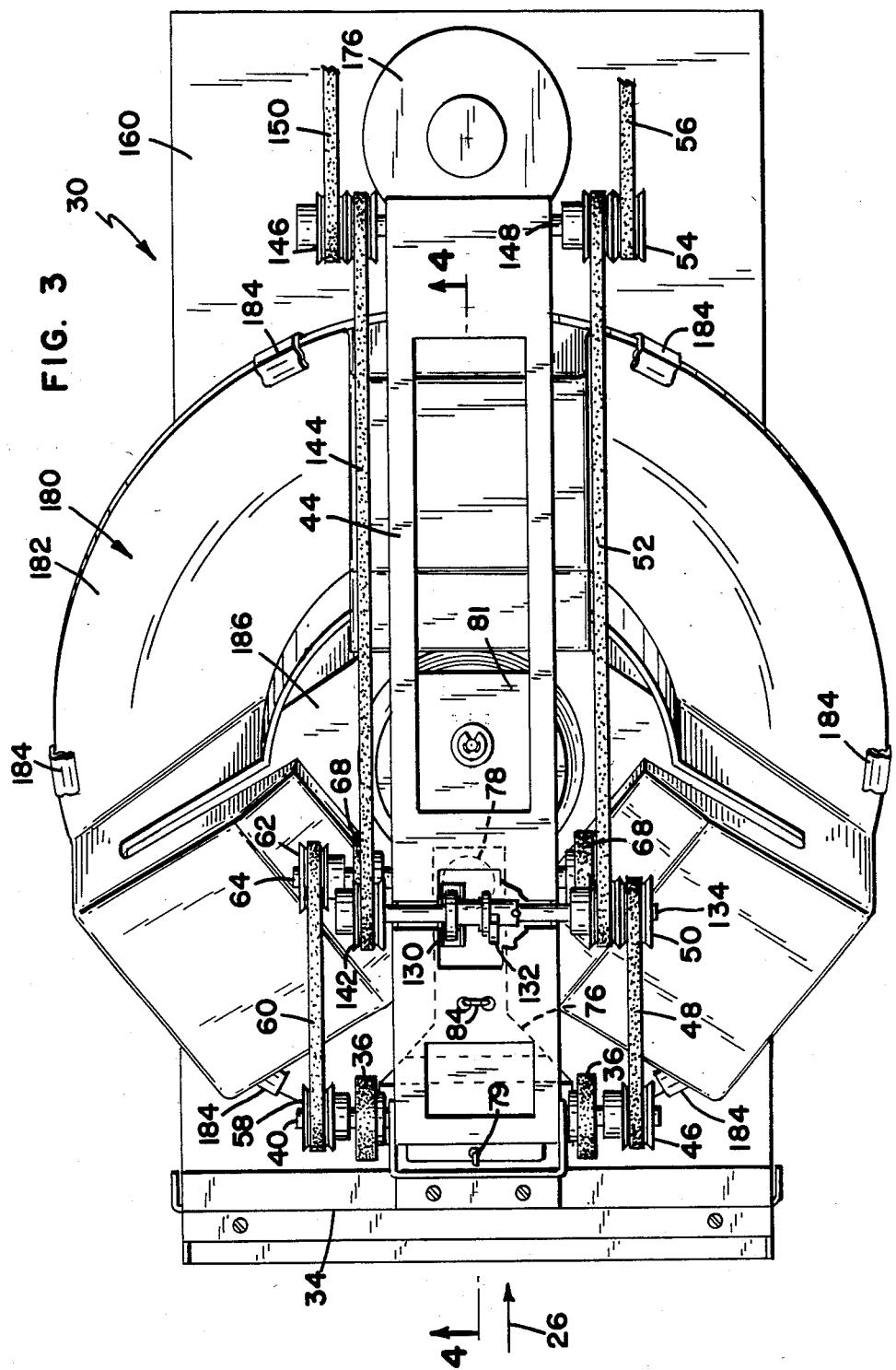
FIG. 3 is a top view of the disk drive system shown in FIG. 2.

Referring to FIGS. 2, 3 and 5, there is shown the universal disk drive system 30 of the invention. The disk 10 to undergo data processing operations such as reading, writing and/or erasing, is inserted in the direction of arrow 26 into a horizontal inlet 32 provided on one side of the frame 34 of the system 30. The disk 10 is then advanced and fed inwardly first between a pair of feed rollers 36 and associated pinch or idler rollers 38. The rollers 36 are fixed to a shaft 40 which is supported by bearings 42 in a fixed arm 44 which extends in a generally parallel position above the feed path of disks 10. A drive pulley 46 is fixed to one end of the shaft 40. The drive pulley 46 is connected via a belt 48 to one side of a dual idler pulley 50, the other side of which is connected by a belt 52 to one side of another dual idler pulley 54. The other side of the second dual idler pulley 54 is connected by a belt 56 to a drive motor (not shown). A driven pulley 58 is fixed to the opposite end of shaft 40 and is connected by belt 60 to a second drive pulley 62 fixed to the end of a second shaft 64 which is also journaled for rotation across the fixed arm 44 by another pair of bearings 66. A pair of second or rear feed rollers 68 are fixed in spaced apart relationship on the shaft 64. It will therefore be appreciated that the system 10 incorporates pairs of front and rear feed rollers 36 and 68, which are both journaled for rotation on a fixed arm 44 and which are driven in unison via belts 56, 52, 48 and 60. The belts and pulleys are preferably of the toothed type for minimum slippage.

Structure is provided for cooperating with the feed rollers 36 and 68 for engaging the disk 10 during advancement into the system 30. As mentioned above, a pair of pinch or idler rollers 38 are provided for cooperation with the front feed rollers 36. The idler rollers 38 are mounted on opposite ends of a shaft 70 which is journaled for rotation by a pair of bearings 72 on a bracket 74. The shaft 70 also supports a pivotal plate 76 which extends between the idler rollers 38 and beneath the disk feed path toward the rear feed rollers 68. A resilient pad 78 is located near the free end of the plate 76 beneath and between the rear feed rollers 68. A tension spring 79 is connected between the other end of the plate 76 and frame 34, for pivotally urging the plate and thus the pad 78 normally upward towards the rear feed rollers 68. A cross plate 80 is mounted on the fixed arm 44 with a pin and slot connection for limiting upward pivotal movement of arm 76 either before or after a disk 10 has been inserted. When the disk 10 is inserted into the inlet 32, it is therefore gripped first between the front feed rollers 36 and idler rollers 38 and then advanced past plate 80, which swings upward, between the rear feed rollers 68 and pad 78 into position for drive with respect to a read/write head and for data transfer as will be explained more fully below.

Figure 4:
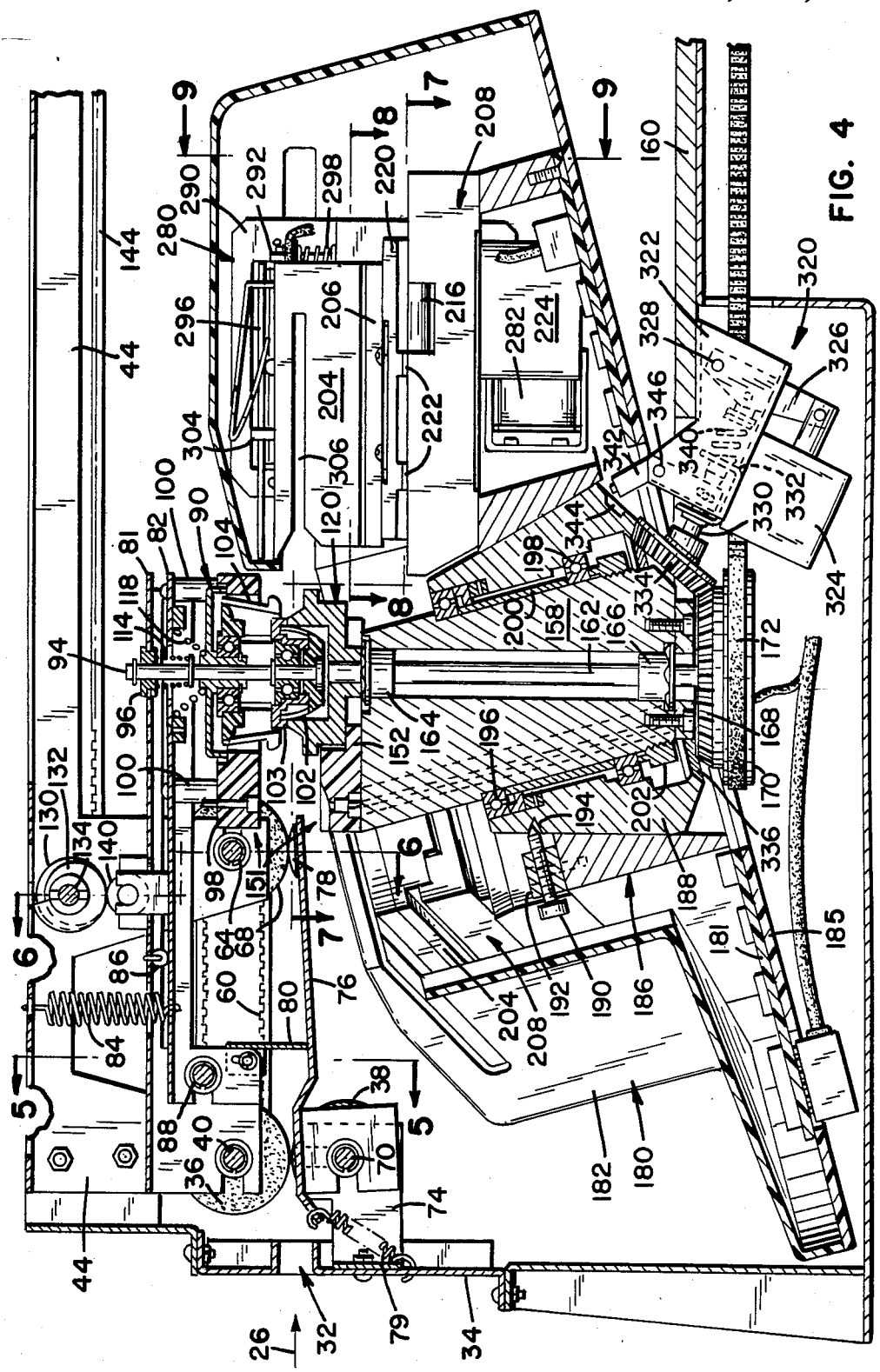
FIG. 4 is an enlarged actional view taken generally along lines 4—4 of FIG. 3 in the direction of the arrow.
Figure 6:
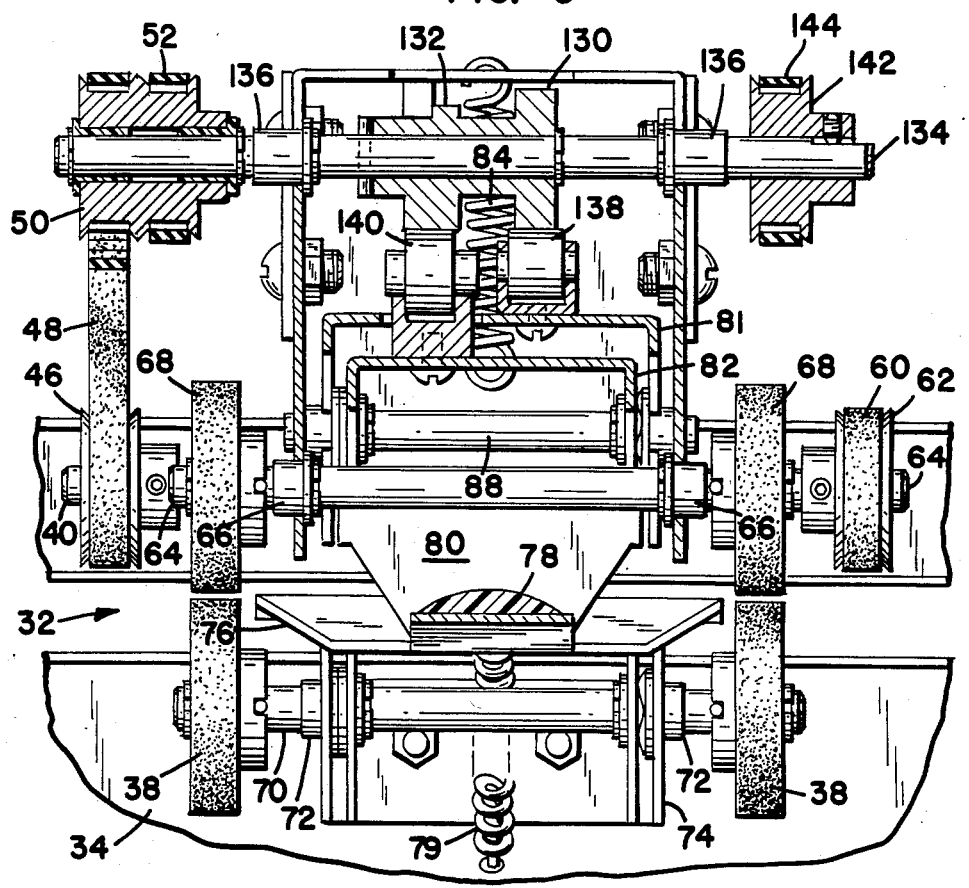

The system 30 incorporates a unique arrangement for engaging either one of two predetermined sizes of disks without any preadjustment whatsoever. Referring to FIGS. 4, 5 and 6, a pair of pivotal arms 81 and 82 are provided below and inside the fixed arm 44. The upper pivotal arm 81 is pivoted about the shaft 40 which also supports the front feed rollers 36. The arms 81 and 82 are normally biased upwardly toward the fixed arm 44 by means of a tension spring 84 connected between arms 44 and 82. A stop 86, as is best seen in FIG. 4, is provided for limiting upward pivotal movement of the lower arm 82 relative to the upper arm 81. The lower pivotal arm 82 is pivoted to a cross shaft 88 which is journaled for rotation within a pair of bearings 89 mounted in the upper pivotal arm 81 near the front feed rollers 38. It will therefore be appreciated that the lower pivotal arm 82 pivots with respect to the upper pivotal arm 81, both of which in turn pivot with respect to the fixed arm 44.

Figure 13:
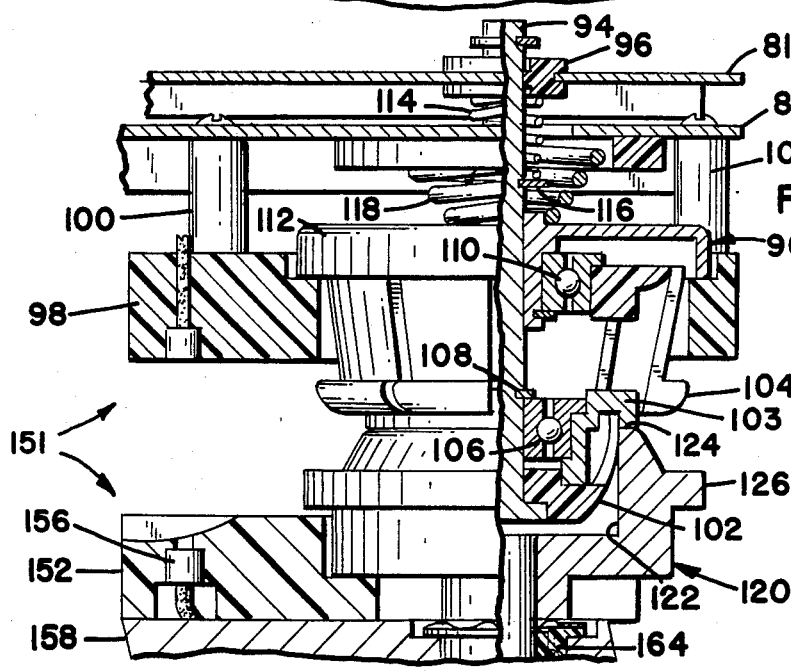
FIG. 13 is an enlarged view (partially cut away) of the clamp cone assembly and disk spindle.

Referring now to FIGS. 4 and 13, a clamp cone assembly 90 is mounted on the free ends of the pivotal arms 81 and 82 for clamping either one of two predetermined sizes of disks having different center-hole sizes against a rotatable drive spindle. The clamp cone assembly 90 includes a generally vertical rod 94 which is slideably secured by a collar 96 in the upper pivotal arm 81. The rod 94 extends downwardly through a clearance hole in the lower pivotal arm 82 and an upper block 98 which is secured to the lower arm by means of stand off spacers 100. A first rotatable clamp cone 102 is located near the lower end of the shaft 94, while a second relatively larger rotatable clamp cone 104 is located along the shaft between the first clamp cone and the lower pivotal arm 82. Cones 102 and 104 are preferably of resilient segmented construction to facilitate engagement with the underlying drive spindle and disk thereon, as will be explained more fully hereinbelow.

The lower cone 102 is secured to a cup 103 rotatably supported by a bearing 106 retained in axial position along the shaft 94 by a retainer ring 108. The upper relatively larger clamp cone 104 is supported for rotation by a bearing 110 on a cup 112 which is slideable along the shaft 94 between the inside of block 98 and a retainer ring 116. A compression spring 114 is provided between the collar 96 on the upper pivotal arm 81 and the retaining ring 116 along the shaft 94 for normally urging the shaft and the lower clamp cone 102 downwardly. Another compression spring 118 is provided between the lower pivotal arm 82 and the cup 112 for independently urging the upper clamp cone 104 downwardly. It will therefore be appreciated that the clamp cone assembly 90 includes a pair of rotatable clamp cones 102 and 104 of different sizes which are mounted for movement along a common shaft 94 supported primarily on the upper pivot arm 81, and which are also normally urged downwardly by springs 114 and 118.

The clamp cone assembly 90 is supported for movement relative to a rotatable disk drive spindle 120 which includes a hollow internal female portion 122 adapted for receiving the lower clamp cone 102 therein. The spindle 120 also includes an external male portion defining a circular upper edge 124 and a flange 126 adapted for receiving the upper clamp cone 104 thereover. When a disk is advanced by feed rollers 36 and 68 into position over the spindle 120, the clamp cone assembly 90 is actuated downwardly to clamp the disk in place on the drive spindle for rotation. The lower cone 102 is adapted to be received through the center hole of a relatively small disk, such as a 5¼ inch disk, and into the recess 122 of the spindle 120 such that the disk is then clamped between the lower end of cup 103 and the upper end 124 of the spindle. The lower cone 102 is thus adapted to pass through the central opening of a small disk and clamp it with the cup 103 to the upper end of the spindle 120. The reverse occurs in the case of a relatively larger disk, which is received over and around the spindle 120 before clamping by the lower end of upper cone 104 against the flange 126 of the spindle. The spindle 120 therefore functions as both male and female portions for receiving either one of the clamp cones 102 and 104 as appropriate in accordance with the size of the disk being handled.

Referring to FIGS. 3, 4 and 6, actuation of the clamp cone assembly 90 is controlled by means of cams 130 and 132 which are fixed to a shaft 134. The shaft 134 is journaled for rotation by a set of bearings 136 mounted in the fixed arm 44. The cam 130 is adapted for engagement with a cam follower 138 mounted on the upper pivotal arm 81, while the cam 132 is adapted for engagement with another cam follower 140 mounted on the lower pivotal arm 82 and which extends through a clearance hole in the upper arm. The cams 130 and 132 are configured to urge the pivotal arms 81 and 82 downward in accordance with rotation of shaft 134. The dual idler pulley 50 which interconnects the drive belts 48 and 52 for the feed rollers 36 and 68, is rotatably mounted on one end of the shaft 134. A drive pulley 142 is fixed to the other end of shaft 134. The drive pulley 142 in turn is connected by a belt 144 to one side of a dual idler pulley 146 rotatably supported on one end of a shaft 148. The other side of the dual idler pulley 146 is connected by a belt 150 to a reversible drive motor (not shown). It will therefore be apparent that actuation of the belts 144 and 150 in one direction causes the cam shaft 134 to rotate in the same direction, thereby urging either one of the pivotal arms 81 and 82, or both of the pivotal arms, downwardly in accordance with the size of the disk being handled by system 30. The amount of rotation of the cam shaft 134 in one direction thus controls the amount by which the pivot arms 81 and 82, and thereby the clamp cone assembly 90, are urged downwardly to secure the disk in place on the spindle 120. If disks of the relatively smaller size are being used and thus require clamping by the lower clamp cone 102, it is only necessary to rotate the cam shaft 134 sufficiently to position assembly 90 as shown in FIGS. 4 and 13. With larger disks, the cam shaft 134 would be rotated further in the same direction to fully lower assembly 90. Similarly, rotation of the cam shaft 134 in the opposite direction allows lifting of the pivot arms 81 and 82 as well as the clamp cone assembly 90 by return spring 84. When a disk is fed into the system 30 by feed rollers 36 and 68 and into position on the drive spindle 120 for data processing operations, it will therefore be apparent that the disk is clamped by the clamp cone assembly 90 at either one of two level positions on the spindle depending upon the size of the disk. The relatively smaller disk is clamped at a slightly higher position on the drive spindle 120 than the larger disk.

Figure 7:
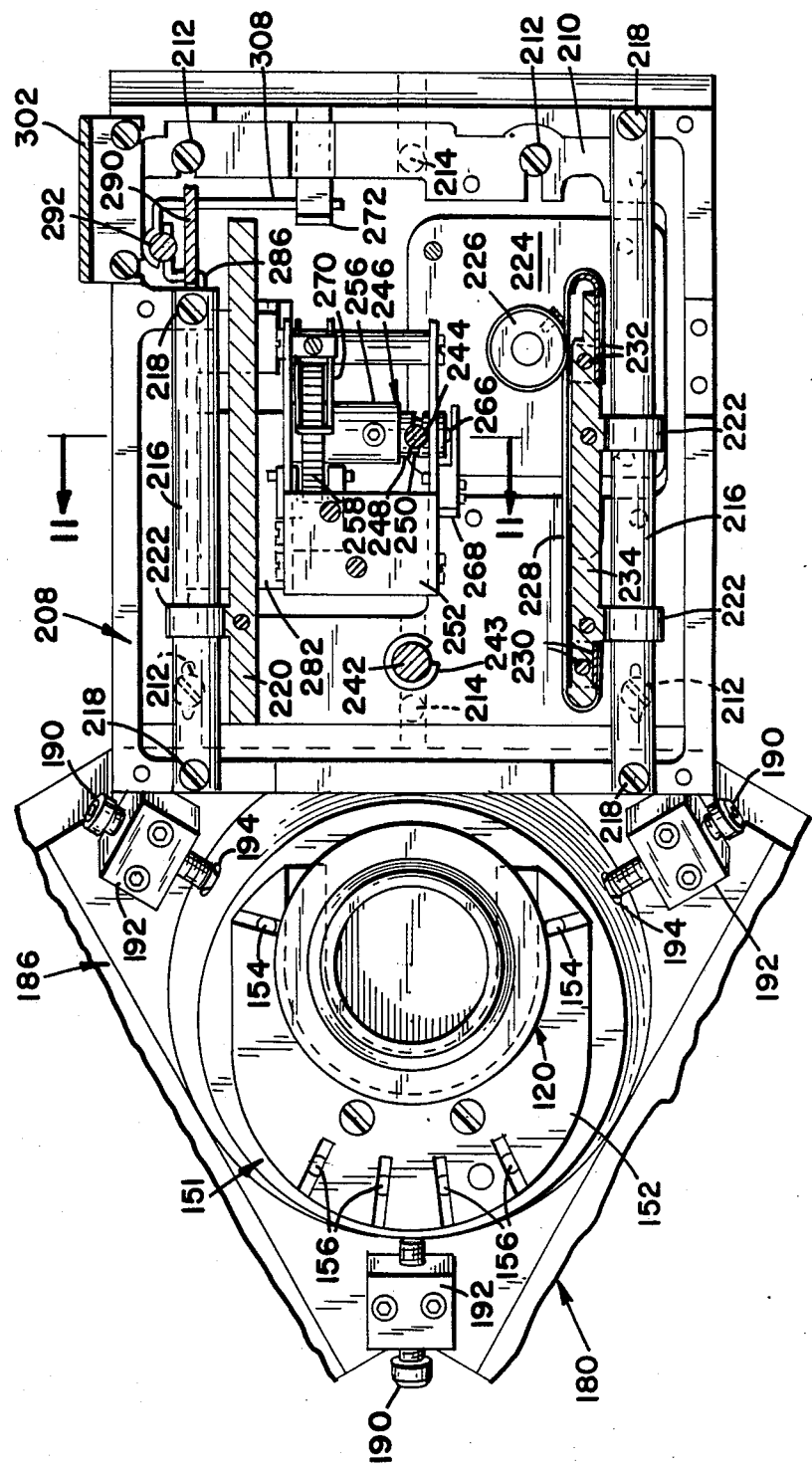
FIGS. 7 and 8 are enlarged horizontal sectional views taken generallly along lines 7—7 and 8—8, respectively, of FIG. 4 in the directions of the arrows showing certain details of the read/write head mounting carriages.

Referring now to FIGS. 4, 7 and 13, a sensor assembly 151 is provided for sensing the type of disk fed into system 30. Just as the clamp cone assembly 90 is surrounded by an upper block 98, the disk drive spindle 120 is surrounded by a lower block 152. The purpose of blocks 98 and 152 is to support suitable sensors arranged for sensing predetermined parameters of the disk received clamped on the spindle 120. The blocks 98 and 152 can be formed from suitable dielectric material, such as DELRIN plastic. As illustrated, the lower block 152 includes a plurality of first and second sensors 154 and 156 which are mounted in recesses in the underside of the block behind radial slits, but which are located at different radii from the center of the spindle 120. The sensors 154 and 156 are of conventional construction comprising optical transmitter and receiver portions which are mounted in opposite corresponding positions in the blocks 98 and 152. The sensors 154 and 156 are preferably located beneath slits as shown for enhanced resolution. The sensors 154 and 156 are located at different radii from the center of the spindle 120 in order to sense passage of the alignment hole(s) of the corresponding disk to control rotational indexing of the disk and the clamp cone assembly 90.

The lower sensor block 152 is mounted on top of a fixed inclined spindle support 158 which is secured to a fixed plate 160, as is best seen in FIG. 4. The spindle support 158 is inclined in a direction against the feed direction of the disks. For example, spindle 158 can be inclined at about 15 degrees off vertical. The disk drive spindle 120 is secured to the upper end of a shaft 162 which extends through the spindle support 158 and which is rotatably supported therein by flanged bearings 164 and 166. A bevel gear 168 and drive pulley 170 are secured to the lower end of the shaft 162. A belt 172 connects the pulley 170 to the pulley 174 of a drive motor 176 shown in FIG. 2 to effect rotation of the spindle 120 and the disk clamped thereto.

A rotatable carousel assembly 180 is also supported on the spindle support 158. As will be explained more fully hereinbelow, the carousel assembly 180 supports the multiple read/write/erase heads for the various disks, as well as some of the associated circuitry on a circular printed circuit board 181. A removable cover 182 is provided for protecting the components of the carousel assembly 180 from dust and the like. The cover 182 is secured by clips 184 to a bottom cover 185.

Referring primarily to FIG. 4, the carousel assembly 180 comprises a spider 186 having equispaced arms, each of which is inclined downwardly at the same angle of inclination as the support spindle 158. The spider 186 includes a tapered central opening which fits over an oppositely tapered hub mounted for rotation about the fixed spindle support 158. The spider 186 is secured to the hub 188 by means of three retaining screws 190 which are threaded through in blocks 192 for engagement at their pointed ends with recesses 194 in the hub 188. The recesses 194 are preferably shaped as shown so that, upon engagement by screws 190, the spider 186 is locked against rotation relative to the hub 188, and is wedged tightly on the hub. The hub 188 in turn, is mounted for rotation about the fixed spindle support 158 by means of bearings 196 and 198, a cylindrical bearing spacer 200, and a retaining ring 202. The upper bearing 196 fits into a circumferential shoulder formed in the fixed spindle support 158, and the hub 188 is constrained against axial movement by the retainer ring 202 threaded about the lower end of the spindle support. It will therefore be appreciated that the spider 186 of the carousel assembly 180 is tightly secured to the hub 188 which in turn is mounted for rotation about the fixed spindle support 158.

Figure 8:
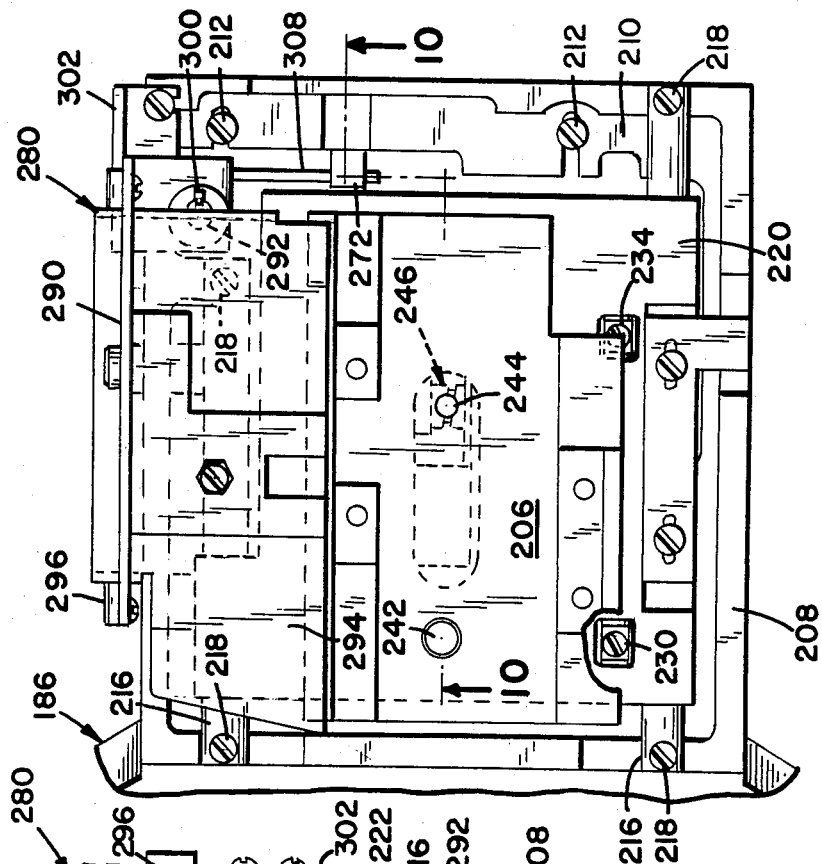
Figure 9:
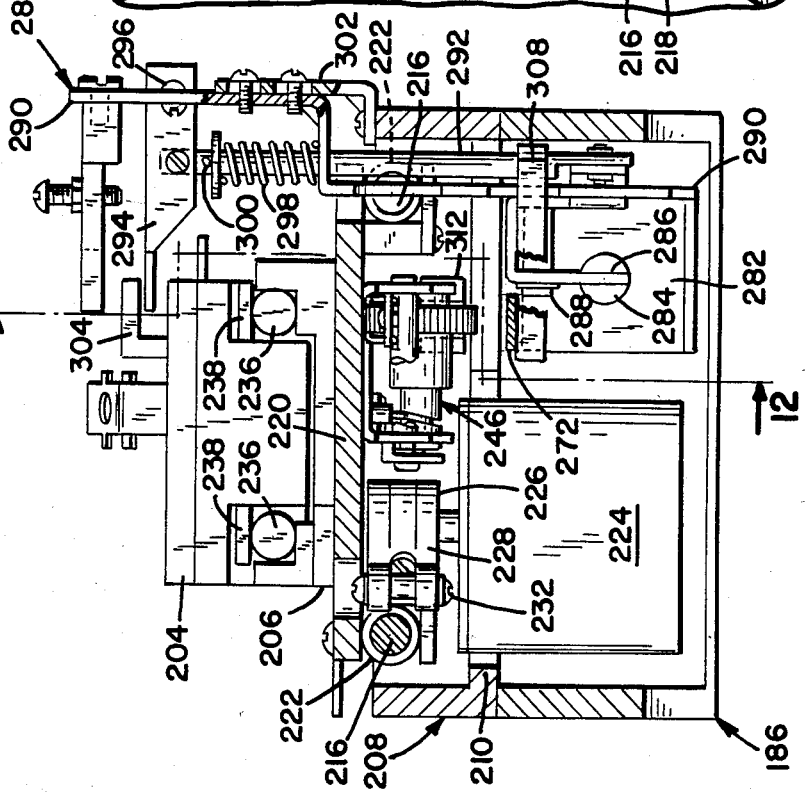
FIG. 9 is an enlarged vertical sectional view taken generally along lines 9—9 of FIG. 4 in the direction of the arrows showing further details of the mounting of the read/write heads.

Referring now to FIGS. 7-9 together with FIG. 4, the carousel assembly 180 further includes multiple read/write/erase heads 204 mounted on the arms of the spider 186. The read/write heads 204, three of which are incorporated in the system 30 as illustrated, are selected for compatibility with the types of disks to be handled by the system 30. For example, one read/write head 204 can comprise a commercial head for use with 8 inch disks, while the other two heads can comprise commercial heads for 5¼ inch disks of either 48 or 96 TPI. In the alternative, read/write heads of all the same type can be utilized to facilitate substitution and off-stream maintenance with miminal downtime of the system. As will be explained more fully hereinbelow, each read/write head 204 is secured to an adaptor plate 206 which is pivotally adjustable with respect to a base 208 for azimuth adjustment. The base 208 is mounted on the associated arm of the spider 186 and supports the corresponding adapter plate 206 and head 204 for movement in a radial direction relative to a disk on the spindle 120.

In particular, the base 208 includes a lower plate 210 which is secured by screws 212 to the spider 186. Various clearance holes are provided in the plate 210 for other components of the base 208. The lower plate 210 preferably includes a longitudinal slot in the underside thereof for receiving a pair of fixed pins 214 on the spider 186 for lateral location of the plate. The plate 210 is preferably secured to the spider 186 through longitudinal slots, as shown in FIG. 7 to provide for initial adjustment upon set-up. A pair of rails 216 are secured to the lower plate 210 by fasteners 218. An upper plate 220 is supported by guides 222 for movement along the rails 216. Movement of the upper plate 220 along the rails 216 is controlled by means of a motor 224 which is secured to the lower plate 210. The motor 224 includes a winding drum 226 secured to its output shaft, and a split band 228 is wrapped around the drum and is secured at opposite ends by fasteners 230 and 232 to a depending longitudinal portion 234 of the upper plate 220. It will therefore be appreciated that the base 208 includes a fixed base plate 210 supporting a movable upper plate 220 which in longitudinally adjustable, in a radial direction relative to the disk, responsive to actuation of the motor 224.

Figure 10:
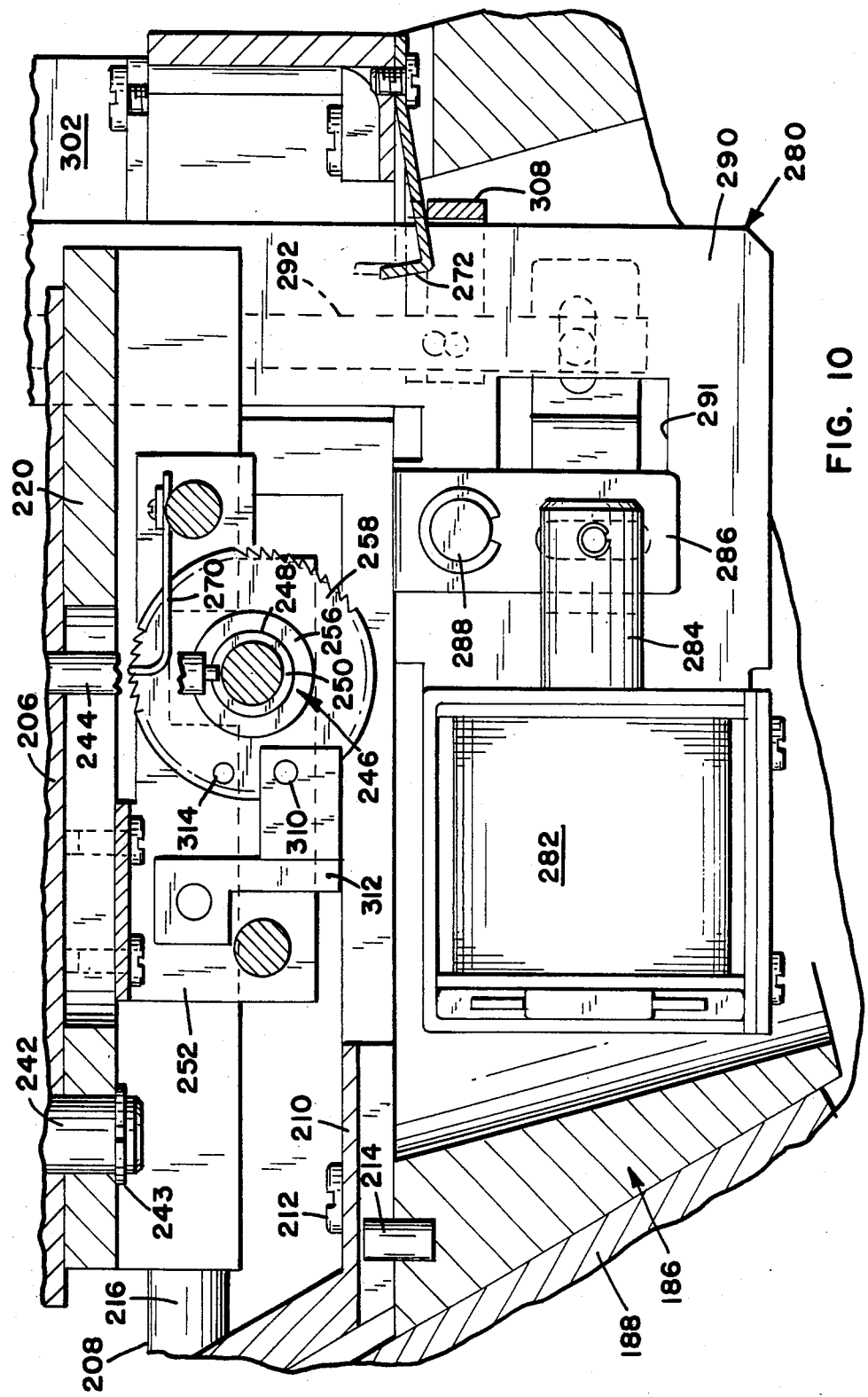
FIG. 10 is an enlarged cross-sectional view taken generally along lines 10—10 of FIG. 8 in the direction of the arrows.

The read/write head 204 is supported on the adaptor plate 206 by means of rails 236 to provide initial adjustment upon set-up. In particular, the read/write head 204 includes opposing clamp ears 238 having longitudinal slots through which the ears are conventionally secured to rails 236 by fasteners (not shown). This type of clamp mounting facilitates for initial longitudinal postioning of the read/write head 204 on the adaptor plate 206 upon set-up. The adaptor plate 206 in turn is pivotally secured to the upper plate 220 of the base 208 by a pin 242 and retaining right 243 as is best seen in FIG. 10. A second pin 244, which is located in spaced relationship with first pin 242, extends through a slot in the adaptor plate 206 and into engagement with an azimuth adjustment module 246. As will be explained more fully hereinbelow, the module 246 functions to move the pin 244 in a generally lateral direction for precisely adjusting azimuth alignment of the read/write head 204 relative to the recording track of the disk.

Referring to FIGS. 9 and 11, there are shown further constructional details of the azimuth adjustment module 246 of the invention. The module 246 includes a slideable barrel cam 248 having a diagonal circumferential slot 250 which receives the lower end of the pivot pin 244 on the adaptor plate 206. The cam 248 is supported for a rotation at its outer end in a bracket 252 secured to the upper plate 220 of the base 208. The inner end of the cam 248 is secured by a set screw 254 to a sleeve portion 256 of a ratchet wheel 258 which is supported for rotation in the opposite side of the bracket. A differential screw 260 having threads of different pitch at opposite ends thereof, also interconnects the cam 248 and ratchet wheel 258 for rough initial adjustment upon set-up. A longitudinal guide slot 262 is provided in the cam 248 for cooperation with a pin or set screw 264 extending through the sleeve portion 256 so that the cam will not turn in the sleeve portion during initial adjustment. After such initial adjustment, the cam 248 and ratchet wheel 258 are secured together by means of the set screw 254. A bearing 266 is provided between the outside end of the cam 248 and a generally L-shaped clamp 268 which secures the cam and ratchet wheel 258 within the bracket 252. A spring keeper 270 is also provided to yieldably retain the ratchet wheel 258 in a given rotational position, while allowing rotation in one direction and restraining the wheel against rotation in the opposite direction.

Actuation of the azimuth adjustment module 246 is controlled after set up by reciprocation against a pawl 272, shown in FIG. 10. As will be explained more fully hereinbelow, a pawl 272 is provided on the base 208 for selective engagement with the ratchet wheel 258 upon reciprocation of the adaptor plate 206 and upper base plate 220 by the stepping motor 224.

Actuation of the pawl 272 in turn is controlled by a load plate assembly 280, the details of which are best seen in FIGS. 10 and 12. The load plate assembly 280 includes a solenoid 282 having an actuator arm 284 which is connected via a pin and slot connection to one side of a pivotal arm 286 supported by a pin 288 on a bracket 290. The solenoid 282 itself is also supported on the lower portion of bracket 290. The arm 286 extends through a slot 291 in the bracket 290 and is connected at its other end by a pin and slot connection to a shaft 292. The upper end of the shaft 292 is coupled to a pivotal load plate 294 which is supported by a pin 296 on the upper portion of the bracket 290. A compression spring 298 is provided between a cross-pin 300 on the shaft 292 and a bent portion of the bracket 290 through which the shaft extends, for normally urging the load plate 294 upward. Another bracket 302 is also secured near the upper end of the bracket 290 for attachment to the fixed base plate 210, for additional support. The points of connection between the support bracket 302 and the base plate 210 preferably comprise screw and slot connections to provide for both vertical and lateral adjustment of the load plate assembly 280 relative to the associated read/write head 204.

During operation of the system 30, the solenoid 282 of the load plate assembly 280 is normally energized such that the actuator arm 284 is inward with the shaft 292 downward and the tip of the load plate 294 extending, as shown in FIG. 9, beneath a clip or tab 304 secured to the top of the read/write head 204. As is best seen in FIGS. 2 and 4, the read/write head 204 defines a generally horizontal slot 306 for receiving the margin of the disk. The portion of the read/write head 204 above the slot 306 can be flexed upward by means of the tab 304 to open the slot slightly more, particularly during insertion or withdrawal of the disk, to avoid damage to the inductive coupling (not shown) within the head. During operation of the system 30, the shaft 292 of the load plate assembly 290 is thus in a normally downward position with the arm 308, which is also secured to the shaft, also downward out of engagement with the pawl 272. When the solenoid 282 is deactivated, however, the spring 298 urges the shaft 292 upward such that the load plate 294 engages the tab 304 to spread the slot 306 wider while the arm 308 simultaneously urges the pawl 272 upward into position for possible engagement with the ratchet wheel 258 of the azimuth adjustment module 246.

If adjustment of the azimuth alignment of the read/write head 204 relative to the disk is desired, the upper plate 220 of the base 208 can be reciprocated backward by the stepping motor 224 so that the ratchet wheel 258 engages pawl 272 and thus indexes the ratchet wheel along with the barrel cam 248 to move the drive pin 244 and thus effect extremely accurate pivotal positioning of the adaptor plate 206. The azimuth adjustment module 246 can thus be "bumped" against the pawl 272 with the stepping motor 224 as many times as necessary to effect the desired alignment. A photo-sensor 310 is preferably provided in a bracket 312 overlying the ratchet wheel 258 for registry with one or more holes 314 in the wheel for detecting the change in azimuth. It will be appreciated that the ratchet wheel 258, barrel cam 248, groove 250, distance between the drive pin 244 and pivot pin 242, and stroke of the movable top plate 220 are calibrated to provide a predetermined precise, stepwise azimuth adjustment with each bump of the module 246 against the pawl 272.

If no adjustment of the azimuth alignment of the read/write head 204 is needed and it is only desired to relocate the head to another recording track on the disk, then only a small longitudinal movement of the plate 220, rather than a full reciprocation, is necessary for radial alignment. Such radial repositioning between the recording tracks on the disk would not take the module 246 into proximity with the pawl 272, which would be in its normal downward position due to the fact that the solenoid 282 of the load plate assembly 280 would be energized. In other words, radial positioning of the read/write head 204 within the access opening 18 between tracks of the disk 10 would normally be accomplished without deenergizing the solenoid 282 to urge the lift tab 304 upward. Actutation of the load plate assembly 280 by deenergizing the solenoid 282 is only preferable when azimuth realignment is necessary and the movable upper plate 20 of the base 208 must be fully reciprocated one or more times relative to the disk, in which case additional clearance is necessary due to movement of the read/write head 204 out of the access opening 18 and over a portion of the jacket 14.

Referring again to FIG. 4, rotational indexing of the carousel assembly 180 is controlled by an index and locking assembly 320. The index and locking assembly 320 includes a bracket 322 secured to the plate 160. The bracket 322 in turn supports a solenoid 324 whose actuator arm is connected via a pin and slot connection to the lower end of a pivotal arm 326. The upper end of the arm 326 is pivoted by a pin 328 to the bracket 322. A load shaft 330 is coupled at one end to the load arm 326 and is guided by a second bracket 332. A beveled pinon gear 334 is rotatably mounted on the other end of the load shaft 330 for simultaneous engagement with the external bevel gear 168 on the drive shaft 162 and an internal bevel gear 336 in the lower end of the hub 188. A compression spring 340 is provided for normally urging the pinion gear 334 away from gears 168 and 336 when the solenoid 324 is deenergized. An inverted generally L-shaped index pin 342 is also provided for cooperation with hub detents 344, one of which is provided for each arm of the spider 180 and the particular read/write head 204 thereon. The index pin 342 is supported on the bracket 322 by a pin 346, and is coupled at its lower end to the load shaft 330 by a pin and slot connection. It will thus be apparent that when the solenoid 324 is energized, the index pin 342 is disengaged from the hub 188 while the pinion gear 334 drivingly engages gears 168 and 336, whereby the carousel assembly 180 rotates to bring another read/write head 204 into position. After the carousel assembly 180 has been repositioned, the solenoid 324 is deenergized so that the pinion gear 334 is disengaged while the index 342 is reengaged by the spring 340.

From the foregoing, it will be apparent that the present invention comprises an improved drive system for floppy disks which incorporates numerous advantages over the prior art. One significant advantage involves the fact that multiple read/write/erase heads are provided for selective positioning into or out of operative position relative to a disk drive spindle. Each head in turn is supported for radial adjustment relative to the concentric recording tracks of the disk, as well as rotational positioning for the desired azimuth alignment relative to the tracks. Precise alignment is accomplished by means of a sliding and pivotal carriage assembly actuated by a stepping motor via a band and winding drum arrangement. Either one of two predetermined sizes of disks can be handled automatically by means of a clamping cone assembly and male/female drive spindle. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any alternatives, modifications, equivalents, and/or rearrangements of elements within the scope of the invention as defined by the following claims.

What is claimed is:

1. A disk drive, comprising:
    a rotatable drive spindle;
    means for advancing a disk along a predetermined input path over said drive spindle;
    means for releasably clamping the disk onto said drive spindle for rotation therewith;

means for effecting rotation of said drive spindle and the disk clamped thereto;

a plurality of read/write heads;

rotatable carousel means for commonly supporting said read/write heads for movement between operative and inoperative positions relative to reading from/writing on the disk clamped on said drive spindle so that one head can be located in operative position while the other heads are located in inoperative position; and means for selectively locking said carousel means against rotation to locate said read/write heads as desired in either position.

2. The disk drive of claim 1, wherein said means for advancing a disk along a predetermined input path, includes:

a pair of laterally spaced apart front feed rollers;

a pair of idler pinch rollers located immediately beneath and associated with said front feed rollers;

a pair of laterally spaced apart rear feed rollers positioned between said front feed rollers and said drive spindle;

an elongate pivotal plate extending beneath the input path between said front and rear feed rollers, said plate being pivotal about the rotational axis of said idler pinch rollers;

a resilient pad secured to said plate adjacent said rear feed rollers;

means for normally urging said pivotal plate and pad upwardly towards said rear feed rollers;

a depending pivotal and slideable gate plate for limiting upward pivotal movement of said pivotal bottom plate, said gate plate being normally gravatationally biased to a down position but pivoting out of engagement with said pivotal plate responsive to passage of a disk between said front and rear feed rollers; and means for driving said front and rear feed rollers in unison.

3. The disk drive according to claim 2, wherein said means for driving said front and rear feed rollers comprises:

a front shaft supporting said front feed rollers in laterally spaced apart relationship thereon;

a pair of drive pulleys mounted on said front shaft;

a rear shaft supporting said rear feed rollers in laterally spaced apart relationship thereon;

a driven pulley mounted on said rear shaft;

a first belt interconnecting one of the drive pulleys on said front shaft with the driven pulley on said rear shaft; and means including a second belt connected to the other drive pulley on said first shaft for effecting driving rotation thereof.

4. The disk drive of claim 1, wherein said means for releasably clamping the disk onto said drive spindle, includes:

inner and outer pivotal arms extending generally above the input path;

a depending support shaft slideably secured to said outer pivot arm;

an inner clamp cone rotatably secured to said support shaft and adapted for receipt by an internal recess formed in said drive spindle to clamp a disk with a predetermined central opening onto said drive spindle;

an outer clamp cone rotatably and slideably supported along said support shaft between said inner clamp cone and inner privotal arm, said outer clamp cone being adapted for engagement with an external flange on said drive spindle to effect clamping of a disk having a relatively larger predetermined central opening thereto;

means for normally urging said support shaft downwardly relative to said outer pivotal arm;

means for normally urging said outer clamp cone downwardly relative to said inner pivotal arm;

means for normally urging said inner and outer pivot arms upwardly to a position out of engagement with said drive spindle; and means for selectively actuating said inner and outer pivotal arms downwardly to engage at least one of said clamp cones against said drive spindle to clamp the disk thereto.

5. The disk drive of claim 1, wherein said means for selectively locking said carousel means against rotation, includes:

an index pin pivotal between positions into and out of engagement with predetermined recesses formed in said carousel means, one recess being associated with each read/write head thereon;

means for normally biasing said index pin to a position out of engagement with said carousel means;

means for selectively actuating said index pin into engagement with said carousel means.

6. The disk drive of claim 1, wherein said means for effecting rotation of said drive spindle comprises:

an upstanding drive shaft, said drive shaft having upper and lower ends with the upper end having connected to said drive spindle;

a drive pulley secured to the lower end of said drive shaft; and means including a drive belt for effecting rotation of said drive shaft.

7. The disk drive of claim 1, further including:

means positioned along the input path and adjacent to said drive spindle for sensing predetermined identification openings in the disk.

8. The disk drive of claim 1, further including:

a removable cover enclosing said carousel means.

9. A disk drive, comprising:

a rotatable drive spindle;

means for advancing a disk along a predetermined input path over said drive spindle;

inner and outer pivotal arms extending generally above the input path;

a depending support shaft slideably secured to said outer pivot arm;

an inner clamp cone rotatably secured to said support shaft and adapted for receipt by an internal recess formed in said drive spindle to clamp a disk with a predetermined central opening onto said drive spindle;

an outer clamp cone rotatably and slideably supported along said support shaft between said inner clamp cone and inner privotal arm, said outer clamp cone being adapted for engagement with an external flange on said drive spindle to effect clamping of a disk having a relatively larger predetermined central opening thereto;

means for normally urging said support shaft downwardly relative to said outer pivotal arm;

means for normally urging said outer clamp cone downwardly relative to said inner pivotal arm;

means for normally urging said inner and outer pivot arms upwardly to a position out of engagement with said drive spindle;

means for selectively actuating said inner and outer pivotal arms downwardly to engage at least one of said clamp cones against said drive spindle to clamp the disk thereto;

said means for actuating said inner and outer pivotal arms, including:

a rotatable control shaft;

first and second cams secured to said control shaft;

a first cam follower mounted on said outer pivotal arm and adapted for engagement by said first cam;

a second cam follower mounted on said inner pivotal arm and extending through an opening in said outer pivotal arm for engagement with said second cam;

means for effecting rotation of said drive spindle and the disk clamped thereto;

a plurality of read/write head;

rotatable carousel means for supporting said read/write heads for movement between operative and inoperative positions relative to reading from/writing on the disk clamped on said drive spindle so that one head can be located in operative position while the other heads are located in inoperative position; and means for selectively locking said carousel means against rotation to locate said read/write heads as desired in either position;

said first and second cams being adapted to urge said respective first and second cam followers downwardly in accordance with rotational positioning of said control shaft;

a drive pulley secured said control shaft; and means including a belt connected to said drive pulley for effecting rotation of said control shaft.

10. A disk drive, comprising:

a rotatable drive spindle;

means for advancing a disk along a predetermined input path over said drive spindle;

means for releasably clamping the disk onto said drive spindle for rotation therewith;

means for effecting rotation of said drive spindle and the disk clamped thereto;

a plurality of read/write heads;

a fixed support spindle located generally beneath said drive spindle, said support spindle being inclined at a predetermined acute angle off vertical;

a tapered hub mounted for rotation about said support spindle;

a spider mounted on said hub for rotation therewith, said spider including a plurality or arms each declined at the same said predetermined acute angle;

means on each arm of said spider for adjustably supporting said read/write heads for horizontal pivotal and longitudinal alignment relative to the disk on said drive spindle;

means for selectively driving said spider to move said read/write heads between operative and inoperative positions adjacent the disk clamped on said drive spindle so that one head can be located in operative position while the other heads are located in inoperative position; and means for selectively locking said carousel means against rotation to locate the said read/write heads as desired in either position.

11. The disk drive according to claim 10, wherein said means for adjustably supporting each read/write head for horizontal pivotal and longitudinal positioning, comprises:

a base plate secured to the associated arm of said spider;

an upper plate supported for longitudinal movement on said base plate;

means connected between said base plate and upper plate for effecting relative longitudinal movement of said upper plate;

an adapter plate pivotally supported on said upper plate for pivotal movement about an extending transverse to the associated arm of said spider, the associated read/write head being mounted on said adapter plate; and means interconnecting said adapter plate and upper plate for selectively effecting pivotal positioning of adapter plate for azimuth alignment between said read/write head and the disk.

12. The disk drive according to claim 11, wherein said means for effecting longitudinal movement of said upper plate relative to said base plate, comprises:

a stepping motor secured to said base plate;

a winding drum driven by said stepping motor; and a split band wrapped about said winding drum and secured at opposite ends in longitudinally spaced apart relationship to said upper plate.

13. The disk drive according to claim 11, wherein said means for selectively effecting pivotal positioning of said adapter plate relative to said upper plate, comprises:

a depending drive pin secured to said adapter plate in spaced apart relationship with the pivotal axis;

a rotatable ratchet wheel;

a keeper for restraining said ratchet wheel against rotation in one direction while yieldably allowing rotation in the other direction;

a barrel cam connected to said ratchet wheel for rotation therewith;

said drive pin having a lower end engaged with a diagonal circumferential slot formed in said barrel cam; and a pawl mounted on said base plate and adapted to effect incremental rotation of said ratchet wheel upon engagement therewith to effect pivotal positioning of said adapter plate.

14. The disk drive according to claim 10, wherein said means for effecting selective rotation of said spider, comprises:

an internal gear secured to said spider;

a bevel gear mounted for movement into and out of engagement between said internal gear and drive spindle drive means;

means for normally urging said bevel gear out of engagement between said internal gear and said drive spindle drive means; and means for selectively actuating said bevel gear into engagement to connect said spider for drive.

15. A disk drive, comprising:

a rotatable drive spindle;

means for advancing a disk along a predetermined input path over said drive spindle;

means for releasably clamping the disk onto said drive spindle for rotation therewith;

means for effecting rotation of said drive spindle and the disk clamped thereto;

a fixed spindle support surrounding said drive spindle, said support being inclinded at a predetermined angle in a direction against the input path;

a spider mounted on said spindle support for rotation, said spider including a plurality of arms declined at the same said predetermined acute angle;

a plurality of read/write heads, one provided for each arm of said spider;

means secured to each arm of said spider for supporting the associated read/write head for longitudinal and pivotal movement into and out of operative position with respect to the disk on said drive spindle;

means for effecting adjustable longitudinal positioning of each read/write head on said spider to effect radial alignment thereof relative to the disk on said drive spindle;

means for effecting adjustable pivotal alignment of each read/write head on said spider relative to the disk on said drive spindle; and means for rotatably indexing said spider about said spindle support to move said read/write heads between operative and inoperative positions ready for reading from/writing on the disk clamped on said drive spindle so that one head can be located in operative position while the other heads are located in inoperative position.

16. The disk drive of claim 15, wherein said means for advancing a disk along a predetermined input path, includes:

a pair of laterally spaced apart front feed rollers;

a pair of idler pinch rollers located immediately beneath and associated with said front feed rollers;

a pair of laterally spaced apart rear feed rollers positioned between said front feed rollers and said drive spindle;

an elongate pivotal plate extending beneath the input path between said front and rear feed rollers, said plate being pivotal about the rotational axis of said idler pinch rollers;

a resilient pad secured to said plate adjacent said rear feed rollers;

means for normally urging said pivotal plate and pad upwardly towards said rear feed rollers;

a depending pivotal and slideable gate plate for limiting upward pivotal movement of said pivotal bottom plate, said gate plate being normally gravationally biased to a down position but pivoting out of engagement with said pivotal plate responsive to passage of a disk between said front and rear feed rollers; and means for driving said front and rear feed rollers in unison.

17. The disk drive of claim 15, wherein said means for releasably clamping the disk onto said drive spindle, includes:

inner and outer pivotal arms extending generally above the input path;

a depending support shaft slideably secured to said outer pivot arm;

an inner clamp cone rotatably secured to said support shaft and adapted for receipt by an internal recess formed in said drive spindle to clamp a disk with a predetermined central opening onto said drive spindle;

an outer clamp cone rotatably and slideably supported along said support shaft between said inner clamp cone and inner pivotal arm, said outer clamp cone being adapted for engagement with an external flange on said drive spindle to effect clamping of a disk having a relatively larger predetermined central opening thereto;

means for normally urging said support shaft downwardly relative to said outer pivotal arm;

means for normally urging said outer clamp cone downwardly relative to said inner pivotal arm;

means for normally urging said inner and outer pivotal arms upwardly to a position out of engagement with said drive spindle; and means for selectively actuating said inner and outer pivotal arms downwardly to engage at least one of said clamp cones against said drive spindle to clamp the disk thereto.

18. The disk drive according to claim 15, wherein said means for effecting longitudinal movement of said upper plate relative to said base plate, comprises:

a stepping motor secured to said base plate;

a winding drum driven by said stepping motor; and a split band wrapped about said winding drum and secured at opposite ends in longitudinally spaced apart relationship to said upper plate.

19. The disk drive according to claim 15, wherein said means for selectively effecting pivotal positioning of said adapter plate relative to said upper plate, comprises:

a depending drive pin secured to said adapter plate in spaced apart relationship with the pivotal axis;

a rotatable ratchet wheel;

a keeper for restraining said ratchet wheel against rotation in one direction while yieldably allowing rotation in the other direction;

a barrel cam connected to said ratchet wheel for rotation therewith;

said drive pin having a lower end engaged with a diagonal circumferential slot formed in said barrel cam; and a pawl mounted on said base plate and adapted to effect incremental rotation ofsaid ratchet wheel upon engagement therewith to effect pivotal positioning of said adapter plate.

20. A disk drive, comprising:

a rotatable drive spindle;

means for advancing a disk along a predetermined input path over said drive spindle;

means for releasably clamping the disk onto said drive spindle for rotation therewith;

means for effecting rotation of said drive spindle and the disk clamped thereto;

a fixed spindle support surrounding said drive spindle, said support being inclined at a predetermined angle in a direction against the input path;

a spider mounted on said spindle support for rotation, said spider including a plurality of arms declined at the same said predetermined acute angle;

a plurality of read/write heads, one provided for each arm of said spider;

means secured to each arm of said spider for supporting the associated read/write head for longitudinal and pivotal movement into and out of operative position with respect to the disk on said drive spindle;

means for effecting adjustable longitudinal positioning of each read/write head on said spider to effect radial alignment thereof relative to the disk on said drive spindle;

means for effecting adjustable pivotal alignment of each read/write head on said spider relative to the disk on said drive spindle;

means for rotatably indexing said spider about said spindle support to move said read/write heads between operative and inoperative positions ready for reading from/writing on the disk clamped on said drive spindle so that one head can be located in operative position while the other head are located in inoperative position, including:

an internal gear secured to said spider;

a bevel gear mounted for movement into and out of engagement between said internal gear and drive spindle drive means;

means for normally urging said bevel gear out of engagement between said internal gear and said drive spindle drive means;

means for selectively actuating said bevel gear into engagement to connect said spider for drive.

21. A disk drive, comprising:

a rotatable drive spindle;

means for advancing a disk along a predetermined input path over said drive spindle;

an outer clamp cone mounted for generally vertical movement relative to said drive spindle;

an inner clamp cone mounted for generally vertical movement relative to said drive spindle, said inner clamp cone being positioned between said outer clamp cone and said drive spindle;

means for normally urging said inner and outer clamp cones to positions in spaced relationship with said drive spindle;

means for selectively actuating said inner and outer clamp cone downwardly into engagement with said drive spindle to clamp the disk for rotation therewith;

said drive spindle being adapted to receive said inner clamp cone therein to clamp a disk with a predetermined central opening thereto, and being adapted to receive said outer clamp cone thereon to clamp a disk having a relatively larger predetermined central opening thereto;

means for effecting rotation of said drive spindle and the disk clamped thereto;

a fixed spindle support surrounding said drive spindle, said support being inclined at a predetermined angle in a direction against the input path;

a spider mounted on said spindle support for rotation, said spider including a plurlaity of arms declined at the same said predetermined acute angle;

a plurality of read/write heads, one provided for each arm of said spider;

means secured to each arm of said spider for supoorting the associated read/write head for longitudinal and pivotal movement into and out of operative position with respect to the disk on said drive spindle;

means for effecting adjustable longitudinal positioning of each read/write head on said spider to effect radial alignment thereof relative to the disk on said drive spindle;

means for effecting adjustable pivotal positioning of each read/write head on said spider to effect azimuthal alignment relative to the disk on said drive spindle; and means for rotatably indexing said spider about said spindle support to move said read/write heads between operative and inoperative positions ready for reading from/writing on the disk clamped on said drive spindle so that one head can be located in operative position while the other heads are located in inoperative positions.

22. The disk drive of claim 21, further including:

inner and outer pivotal arms extending generally above the input path;

a depending support shaft slidably secured to said outer pivot arm;

said inner clamp cone being rotatably secured to said support shaft and said outer clamp cone being rotatably and slidably secured to said support shaft.

23. The disk drive of claim 21, wherein said supporting means for each read/write head comprises:

a base plate secured to the associated arm of said spider;

an upper plate supported for longitudinal movement on said base plate;

means connected between said base plate and upper plate for effecting relative longitudinal movement of said upper plate;

an adapter plate pivotally supported on said upper plate for pivotal movement about an extending transverse to the associated arm of said spider, the associated read/write head being mounted on said adapter plate; and means interconnecting said adapter plate and upper plate for selectively effecting pivotal positioning of adapter plate for azimuth alignment between said read/write head and the disk.

24. The disk drive according to claim 23, wherein said means for effecting adjustable longitudinal positioning of said upper plate relative to said base plate, comprises:

a stepping motor secured to said base plate;

a winding drum driven by said stepping motor; and a split band wrapped about said winding drum and secured at opposite ends in longitudinally spaced apart relationship to said upper plate.

25. The disk drive according to claim 23, wherein said means for effecting adjustable pivotal positioning of said adapter plate relative to said upper plate, comprises:

a depending drive pin secured to said adapter plate in spaced apart relationship with the said upright pivotal axis;

a rotatable ratchet wheel;

a keeper for restraining said ratchet wheel against rotation in one direction while yieldably allowing rotation in the other direction;

a barrel cam connected to said ratchet wheel for rotation therewith;

said drive pin having a lower end engaged with a diagonal circumferential slot formed in said barrel cam; and a pawl mounted on said base plate and adapted to effect incremental rotation of said ratchet wheel upon engagement therewith to effect pivotal positioning of said aadapter plate.

26. A disk drive, comprising:

a rotatable drive spindle;

means for advancing a disk along a predetermined input path over said drive spindle;

an outer clamp cone mounted for generally vertical movement relative to said drive spindle;

an inner clamp cone mounted for generally vertical movement relative to said drive spindle, said inner clamp cone being positioned between said outer clamp cone and said drive spindle;

means for normally urging said inner and outer clamp cones to positions in spaced relationship with said drive spindle;

means for selectively actuating said inner and outer clamp cones downwardly into engagement with said drive spindle to clamp the disk for rotation therewith;

said drive spindle being adapted to receive said inner clamp cone therein to clamp a disk with a predetermined central opening thereto, and being adapted to receive said outer clamp cone thereon to clamp a disk having a relatively larger predetermined central opening thereto;

means for effecting rotation of said drive spindle and the disk clamped thereto;

a fixed spindle support surrounding said drive spindle, said support being inclined at a predetermined angle in a direction against the input path;

a spider mounted on said spindle support for rotation, said including a plurality of arms declined at the same said predetermined acute angle;

a plurality of read/write heads, one provided for each arm of aid spider;

means secured to each arm of said spider for supporting the associated read/write head for longitudinal and pivotal movement into and out of operative position with respect to the disk on said drive spindle;

means for effecting adjustable longitudinal positioning of each read/write head on said spider to effect radial alignment thereof relative to the disk on said drive spindle;

means for effecting adjustable pivotal positioning of each read/write head on said spider to effect azimuthal alignment relative to the disk on said drive spindle;

means for rotatably indexing said spider about said spindle support to move said read/write heads between operative and inoperative positions ready for reading from/writing on the disk clamped said drive spindle so that one head can be located in operative position while the other heads are located in inoperative positions;

inner and outer pivotal arms extending generally above the input path;

a depending support shaft slidably secured to said outer pivot arm;

said inner clamp cone being rotatably secured to said support shaft and said outer clamp cone being rotatably and slidably secured to said support shaft; and means for actuating said inner and outer pivot arm, including:
a rotatable control shaft;
first and second cams secured to said shaft;
a first cam follower mounted on said outer pivotal arm and adapted for engagement by said first cam;
a second cam follower mounted on said outer pivotal arm and extending through an opening in said outer pivotal arm for engagement with said second cam;
said first and second cams being adapted to urge said respective first and second cam followers downwardly in accordance with rotational positioning of said control shaft;
a drive pulley secured said control shaft; and
means including a belt connected to said drive pulley for effecting rotation of said control shaft.

27. Apparatus for driving disks having either of two predetermined central opening sizes, comprising:
a rotatable drive spindle;
means for advancing a disk along a predetermined input path over said drive spindle;
inner and outer pivotal arms extending generally above the input path;
a depending support shaft slidably secured to said outer pivotal arm;
an inner clamp cone rotatably secured to said support shaft and adapted for receipt in an internal recess formed in said drive spindle to clamp a disk with a predetermined central opening onto said drive spindle;
an outer clamp cone rotatably and slidably supported along said support shaft between said inner clamp cone and inner pivotal arm, said outer clamp cone being adapted for engagement over said drive spindle to clamp a disk with a relatively larger predetermined central opening thereto;
means for normally urging said support shaft downwardly relative to said outer pivotal arm;
means for normally urging said outer clamp cone downwardly relative to said inner pivotal arm;
means for normally urging said inner and outer pivotal arms upwardly to a position out of engagement with said drive spindle;
means for selectively actuating said inner and outer pivotal arms downwardly to engage at least one of said clamp cones against said drive spindle to clamp the disk thereto, and;
means for effecting rotation of said drive spindle and the disk clamped thereto.

28. The disk drive of claim 27, wherein said means for advancing a disk along a predetermined input path, includes:
a pair of laterally spaced apart front feed rollers;
a pair of idler pinch rollers located immediately beneath and associated with said front feed rollers;
a pair of laterally spaced apart rear feed rollers positioned between said front feed rollers and said drive spindle;
an elongate pivotal plate extending beneath the input path between said front and rear feed rollers, said plate being pivotal about the rotational axis of said idler pinch rollers;
a resilient pad secured to said plate adjacent said rear feed rollers;
means for normally urging said pivotal plate and pad upwardly towards said rear feed rollers;
a depending pivotal and slideable gate plate for limiting upward pivotal movement of said pivotal bottom plate, said gate plate being normally gravitationally biased downwardly but pivoting out of engagement with said pivotal plate responsive to passage of a disk between said front and rear feed rollers; and
means for driving said front and rear feed rollers in unison.

29. The disk drive according to claim 28, wherein said means for driving said front and rear feed rollers comprises:
a front shaft supporting said front feed rollers in laterally spaced apart relationship thereon;
a pair of drive pulleys mounted on said front shaft;

a rear shaft supporting said rear feed rollers in laterally spaced apart relationship thereon;

a driven pulley mounted on said rear shaft;

a first belt interconnecting one of the drive pulleys on said front shaft with the driven pulley on said rear shaft; and means including a second belt connected to the other drive pulley on said first shaft for effecting driving rotation thereof.

30. The apparatus of claim 27, wherein said means for effecting rotation of said drive spindle comprises:

a drive shaft connected to said spindle;

a driven pulley secured to said drive shaft;

a drive pulley;

a motor for driving said drive pulley; and a belt interconnecting said drive pulley and said drive pulley.

31. A disk drive, comprising:

a rotatable drive spindle;

means for advancing a disk along a predetermined input path over said drive spindle;

an outer clamp cone mounted for generally vertical movement relative to said drive spindle;

an inner clamp cone mounted for generally vertical movement relative to said drive spindle, said inner clamp cone being positioned between said outer clamp cone and said drive spindle;

means for normally urging said inner and outer clamp cones to positions in spaced relationship with said drive spindles;

means for actuating said inner and outer pivotal arms, including:

a rotatable control shaft;

first and second cams secured to said control shaft;

a first cam follower mounted on said outer pivotal arm and adapted for engagement by said first cam;

a second cam follower mounted on said inner pivotal arm and extended through an opening in said outer pivotal arm for engagement with said second cam;

said first and second cams being adapted to urge said respective first and second cam followers downwardly in accordance with rotational positioning of said control shaft;

a drive pulley secured to control shaft; and means including a belt connected to said drive pulley for effecting rotation of said control shaft;

said drive spindle being adapted to receive said inner clamp cone therein to clamp a disk with a predetermined central opening thereto, and being adapted to receive said outer clamp cone thereon to clamp a disk having a relatively larger predetermined central opening thereto;

means for effecting rotation of said drive spindle and the disk clamped thereto;

a fixed spindle support surrounding said drive spindle, said support being inclined at a predetermined angle in a direction against the input path;

a spider mounted on said spindle support for rotation, said spider including a plurality of arms declined at the same said predetermined acute angle;

a plurality of read/write heads, one provided for each arm of said spider;

means secured to each arm of said spider for supporting the associated read/write head for longitudinal and pivotal movement into and out of operative position with respect to the disk on said drive spindle;

means for effecting adjustable longitudinal positioning of each read/write head on said spider drive to effect radial alignment relative to the disk on said drive spindle;

means for effecting adjustable pivotal positioning of each read/write head on said spider to effect azimuthal alignment relative to the disk on said drive spindle; and means for rotatably indexing said spider about said spindle support to move said read/write heads between operative and inoperative positions relative to the disk on said drive spindle.

32. A carousel assembly for supporting multiple read/write heads for selective positioning between operative and inoperative positions relative to a disk on a rotatable drive spindle in a disk drive, comprising:

a fixed support spindle located generally beneath said drive spindle, said support spindle being inclined at a predetermined acute angle off vertical;

a tapered hub mounted for rotation about said support spindle;

a spider mounted on said hub for rotation therewith, said spider including a plurality of arms each declined at the same said predetermined acute angle;

means on each arm of said spider for adjustably supporting on of said read/write heads for horizontal pivotal and longitudinal alignment relative to the disk on said drive spindle; and means for selectively driving said spider to index said read/write heads between operative and inoperative positions adjacent said drive spindle so that one head can be located in operative position while the other heads are located in inoperative position.

33. The carousel assembly according to claim 32, wherein said means for adjustably supporting each read/write head for horizontal pivotal and longitudinal positioning, comprises:

a base plate secured to the associated arm of said spider;

an upper plate supported for longitudinal movement on said base plate;

means connected between said base plate and upper plate for effecting relative longitudinal movement of said upper plate;

an adapter plate pivotally supported on said upper plate for pivotal movement about an axis extending transverse to the associated arm of said spider the associated read/write head being mounted on said adapter plate; and means interconnecting said adapter plate and upper plate for selectively effecting pivotal positioning of adapter plate for azimuth alignment between said read/write head and the disk.

34. The carousel assembly according to claim 33, wherein said means for effecting longitudinal movement of said upper plate relative to said base plate, comprises:

a stepping motor secured to said base plate;

a winding drum driven by said stepping motor; and a split band wrapped about said winding drum and secured at opposite ends in longitudinally spaced apart relationship to said upper plate.

35. The carousel assembly according to claim 33, wherein said means for selectively effecting pivotal positioning of said adapter plate relative to said upper plate, comprises:

a depending drive pin secured to said adapter plate in spaced apart relationship with the said upright pivotal axis;

a rotatable ratchet wheel;

a keeper for restraining said ratchet wheel against rotation in one direction while yieldably allowing rotation in the other direction;

a barrel cam connected to said ratchet wheel for rotation therewith;

said drive pin having a lower end engaged with a diagonal circumferential slot formed in said barrel cam; and a pawl mounted on said base plate and adapted to effect incremental rotation of said ratchet wheel upon engagement therewith to effect pivotal positioning of said adapter plate.

36. The carousel assembly according to claim 32, wherein said means for effecting selective rotation of said spider, comprises:

an internal gear secured to said spider;

an external gear secured to said drive spindle;

a bevel gear and meshed between said internal and external gears;

a drive pulley secured to said external gear; and means including a drive belt for effecting rotation of said external drive gear.

37. Apparatus for supporting a read/write head for horizontal pivotal and longitudinal positioning relative to a disk on a drive spindle in a disk drive, comprising:

a base plate;

an upper plate supported for longitudinal movement on said base plate;

means connected between said base plate and said upper plate for selectively effecting relative longitudinal movement of said upper plate for radial radial alignment between said read/write head and the disk;

an adapter plate pivotally supported on said upper plate for pivotal movement about an axis extending transverse to the base plate, said read/write head being mounted on said adapter plate; and means interconnecting said adapter plate and upper plate for selectively effecting predetermined incremental pivotal positioning of said adapter plate for step-wise azimuth alignment between said read/write head and the disk.

38. The apparatus of claim 37, wherein said means for effecting longitudinal movement of said upper plate relative to said base plate, comprises:

a stepping motor secured to said base plate;

a winding drum driven by said stepping motor; and a split band wrapped about said winding drum and secured at opposite ends in longitudinally spaced apart relationship to said upper plate.

39. The apparatus of claim 37, wherein said means for selectively effecting pivotal positioning of said adapter plate relative to said upper plate, comprises:

a depending drive pin secured to said adapter plate in spaced apart relationship with the said upright pivotal axis;

a rotatable ratchet wheel;

a keeper for restraining said ratchet wheel against rotation in one direction while yieldably allowing rotation in the other direction;

a barrel cam connected to said ratchet wheel for rotation therewith;

said drive pin having a lower end engaged with a diagonal circumferential slot formed in said barrel cam; and a pawl mounted on said base plate and adapted to effect incremental rotation of said ratchet wheel upon engagement therewith to effect pivotal positioning of said adapter plate.

40. The apparatus according to claim 39, further including:

said read/write head including a transverse notch for receiving the disk;

said pawl being movable between operative and inoperative positions relative to said ratchet wheel and being normally urged toward the inoperative position; and means for selectively urging said pawl to the operative position for engagement with said ratchet wheel upon reciprocation of said upper plate, and for engaging said read/write head to open the notch thereof further for more clearance with the disk.

* * * * *